W. M. FULTON.

RADIATOR CASING.

APPLICATION FILED NOV. 24, 1916.

Reissued June 5, 1917.

14,309.

2 SHEETS—SHEET 1.

Inventor

Weston M. Fulton.

By Mauro, Cameron, Lewis & Massie

Attorneys

W. M. FULTON.
RADIATOR CASING.
APPLICATION FILED NOV. 24, 1916.
Reissued June 5, 1917.
14,309.
2 SHEETS—SHEET 2.
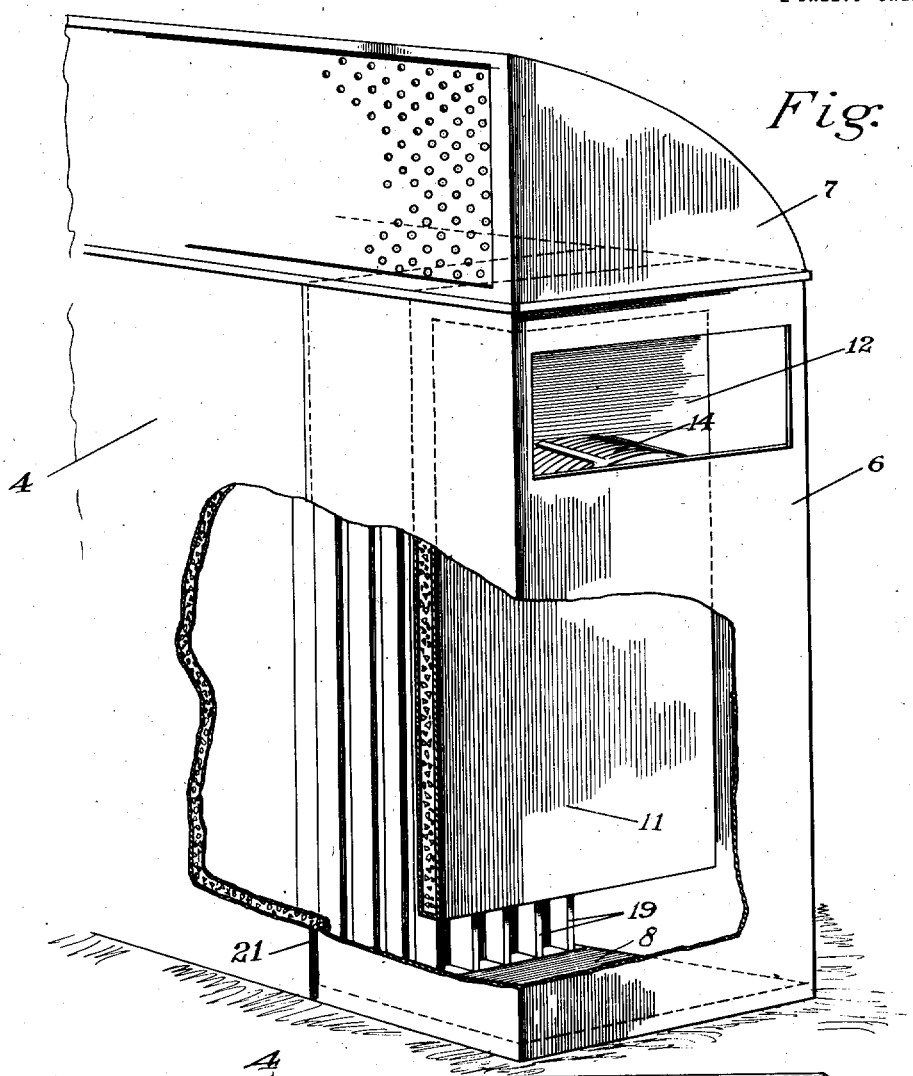
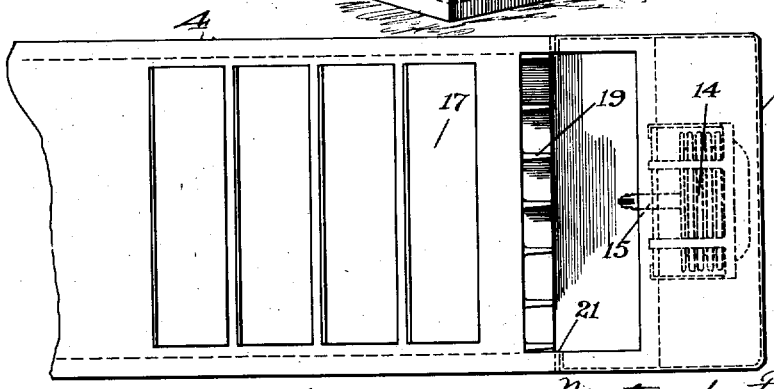
Fig. 4.
Inventor
By Weston M. Fulton,
Mauro, Cameron, Lewis & Massie
Attorneys

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

RADIATOR-CASING.

14,309. Specification of Reissued Letters Patent. Reissued June 5, 1917.

Original No. 1,192,411, dated July 25, 1916, Serial No. 859,060, filed August 28, 1914. Application for reissue filed November 24, 1916. Serial No. 133,265.

*To all whom it may concern:*

Be it known that I, WESTON M. FULTON, a citizen of the United States of America, and a resident of Knoxville, Tennessee, have invented a new and useful Improvement in Radiator-Casings, which invention is fully set forth in the following specification.

This invention relates to devices for controlling a source of heat such, for example, as a radiator; and more particularly to devices of this class in which a thermosensitive means, subject to room-temperature, is used for automatically operating dampers for controlling the flow of heated air through a radiator jacket.

The invention has for its object to provide a device of the type indicated in which the thermosensitive element shall be free from sudden changes of temperature, such as may arise from accidental cold drafts from open windows, and shall be protected from both the direct and indirect heating influence of the radiator, while being subjected at the same time to air from the room at or near the average room-temperature.

A further object of this invention is to provide a thermostatic control of a source of heat wherein the temperature-responsive element is concealed within a conduit having an inlet at a level intermediate the upper and lower strata of air within the room with which it communicates and wherein means are provided for inducing a circulation of air through said conduit and over said temperature-responsive element.

Broadly stated, the invention consists in operatively connecting means for controlling a source of heat, such, for example, as dampers for controlling the flow of heated air through a radiator casing, with thermosensitive means positioned within a conduit having an inlet adapted to receive air from the room at or near the average room-temperature, means being provided for inducing a circulation of air through said conduit, preferably in the form of an air passage communicating with said conduit and in heat interchanging relation with the radiator, and for protecting said conduit and the temperature-responsive element therein from the heating influences of said radiator and passage while subjecting said element to air at or near the average room-temperature.

By way of illustrating one constructional form of my invention, I provide a radiator casing, here shown as having a hood, and having dampers for controlling the flow of heated air therethrough, with an air passage in heat interchanging relation with a portion of the inclosed radiator, and with a conduit communicating with said passage and having an inlet to receive air, preferably near its top and at a level intermediate the upper and lower strata of air in the room with which it communicates. Within said conduit is positioned thermosensitive means operatively connected with said dampers. Said passage and conduit may be, and as here shown are, constructed in an extension of the casing, which extension is partitioned from the main or radiator space in the casing by means of a specially formed end section of the radiator consisting of a hollow wall, said end section performing the double function of a heating section and a partition, and being preferably located at the inlet end of said radiator. In said extension is located a vertical insulating partition dividing the interior thereof into two vertical compartments communicating adjacent their lower ends. The outer of these compartments opens to the room, preferably adjacent its upper end, and the inner of said compartments is provided with an outlet opening at or adjacent its upper end, the latter compartment being cut off from the main radiator space, as by the end wall of the radiator. These two compartments, in the construction chosen to illustrate the invention, constitute a U-shaped duct, one branch of which is in heat interchanging relation with the end section of the radiator and opens at its top into the room. As here shown, this branch opens to the room through the freely open hood. The other branch of this duct is also in free communication with the room through an inlet opening adjacent its top. To secure the maximum difference of temperature between these two branches, whereby vigorous circulation of air through said compartments may be secured, said partition is made of non-heat conducting material, such as cork, said partition also shielding the thermosensitive means in the outer compartment from the heat of the radiator and enabling said means to respond more nearly to the temperature of the air entering from the room. To avoid transfer of heat by conduction between the walls of the main radiator casing and the extension, said extension is preferably insulated from the walls of the said main portion. The bottom wall of the extension which extends beyond the pipe connections to the radiator and the top wall closing the conduit in which is situated the thermostatic device are also preferably made of heat-insulating material. Furthermore, to avoid transfer of heat by conduction through the connections between the thermostatic device and the dampers in the casing, the connections which pass through the wall separating the two compartments are preferably made of heat-insulating material, or if of metal, means are provided for circulating cool air about the same. To avoid hot air escaping around such connections, a packing joint is preferably provided through which the connections work.

As a result of this construction, the thermostatic device is enabled to control the dampers of the casing, or other means controlling a source of heat, practically uninfluenced by all forms of heat emanating from the radiator, or such other source, and is affected only by air from the room which represents very nearly the average room-temperature.

In order that the invention may be more readily understood, reference is had to the accompanying drawings which illustrate one mechanical embodiment of the inventive idea. The drawings are merely intended to assist the description and not to define the limits of the invention.

Fig. 3 is a perspective view with parts of the casing broken away to show the interior arrangement; and Fig. 4 is a top plan view with the hood removed, showing the arrangement of dampers.

Figure 1:
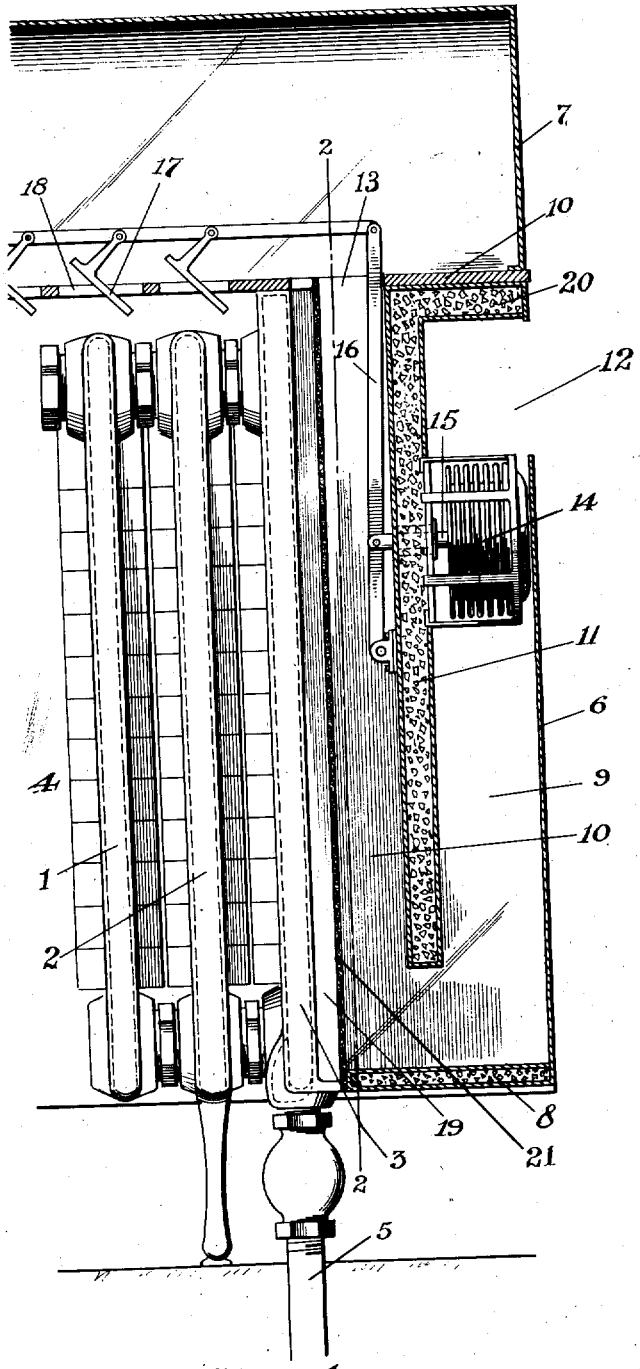
Figure 1 is a longitudinal vertical sectional view of a portion of a radiator casing constructed in accordance with my improvement and showing heating sections in elevation.
Figure 2:
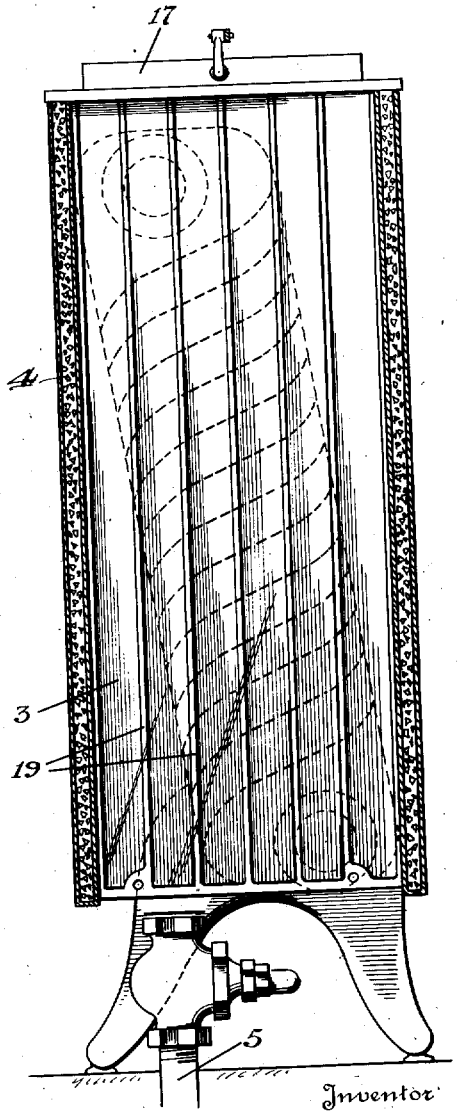
Fig. 2 is a transverse vertical sectional view taken on the line 2—2 of Fig. 1, showing the face of the end section of the radiator and the bottom pipe connections.

In the drawing, Fig. 1 exhibits three radiator sections 1, 2 of the inclined ribbed type, and an end section 3 in the form of a hollow plate or wall, inclosed in a casing 4, the bottom of end section 3 being connected with a pipe 5 of the heating system and preferably the inlet pipe.

As shown, 6 is an end extension of the radiator casing adapted to fit snugly around the heating section 3 which separates the extension from the main radiator space of the casing and is surmounted by an extension of the hood 7 of the casing. The bottom of this extension is closed by a floor 8 consisting of a plate of sheet-metal lined with insulating material, such as cork or the like, and projects above and beyond the inlet pipe connection 5, being designed to shield the interior of the extension from the heating influence of said pipe.

The space within this extension is divided into two compartments 9 and 10 by means of a depending partition 11 of heat-insulating material which terminates just above the floor 8, permitting communication at this point between the said compartments and providing an inlet opening for the compartment 10 and an outlet opening for the compartment 9. The conduit constituted by compartment 9 is provided with an inlet opening 12, preferably adjacent its upper end and shown as in the upper portion of the end wall of the extension, whereby it receives air at a level intermediate the upper and lower strata within the room with which it communicates. The air passage constituted by compartment 10 is provided with an outlet opening at or adjacent its upper end and, when the casing is provided with a hood as at 7, this outlet 13 may be constructed in the top wall to open into the extension of said hood through which it is in open communication with the room. As here shown, the inner wall of said air passage is constituted by the end section 3 of the radiator, and, in order to prevent the setting up of convectional currents between the spaces within the casing proper and the extension thereof, said casing should, by preference, snugly engage said end section 3, whereby the air passage will be closed against air circulation between said casing and passage.

A thermosensitive device 14 is supported and concealed in conduit 9, preferably near the inlet opening 12, and is provided with a connection 15, preferably of an appropriate heat-insulating material such as wood, which passes through the partition wall 11 and is pivotally connected to the damper-operating lever 16, said lever having operating connections with dampers 17 which control openings 18 between the space in which the main radiator sections are positioned and the hood. To prevent heated air passing from passage 10 into conduit 9 and affecting the thermostatic device, wall 11 is preferably provided with a packing-box through which the connection 15 works. To facilitate the heating of air in passage 10 and thereby hasten air circulation past the thermostatic device, ribs 19 are provided on the end section 3, projecting into passage 10. To insulate conduit 9 from the heating influence of the hood, the top of said conduit may be covered with heat-insulating material as shown at 20.

The vertical walls of the casing extension may be, and preferably are, of sheet-metal of single thickness, but their edges, where they join the casing proper, should be heat-insulated therefrom in any suitable way, as by asbestos strips 21, for the purpose of reducing, as much as possible, conduction of heat from the walls of the casing proper to the walls of the extension, particularly the walls of said conduit 9.

The operation of my improvement will be readily understood from the above description, and, briefly stated, is as follows:—

Steam or hot water having been admitted through the inlet pipe 5 to the radiator, the end wall 3 imparts its heat to the air in passage 10, thereby reducing its density and causing it to ascend through outlet opening 13 where it passes freely into the room. Cooler air, taken from a level whereat it approximates the average temperature of the room, is drawn in through opening 12 and, passing down through conduit 9 and around the thermostatic device, enters passage 10. Circulation of a body of air is thus established independently of the circulation past the main radiator sections. The thermostat responds to any variation of temperature of the air coming in from the room and operates the dampers through the intermediate connections. Partition 11 effectively insulates the thermostatic device from the heating influence of the radiator and the heated air in passage 10; floor 8 effectively insulates said device from the heating influence of the inlet pipe and prevents convection currents set up around such pipe from finding their way into conduit 9; insulating wall 20 shields said device from the heating influence of air in the hood; heat conduction through connection 15 is avoided by making this connection of heat-insulating material; while the walls of the extension are insulated from the conduction of heat from the walls of the casing proper by the insulating strips 21. Thereby is the conduit 9 and the thermostatic device therein effectively insulated from the heating influence of the radiator and air passage, and said device subjected to a current of air at a temperature approximating that of average room-temperature.

What is claimed is:—

1. A radiator casing comprising a radiator-receiving portion provided with dampers and a second portion adapted to be separated therefrom by an end section of the radiator, said second portion having a floor of insulating material and a top wall, a vertical partition of insulating material dividing the space therein into a down-passage and an up-passage open to each other through said partition near said floor, one of said passages being in heat-interchanging relation with the end of the radiator and opening through said top-wall, and the other passage being insulated from the radiator and opening through the end wall of the casing below said top wall to receive air from the room, and a thermostat located near the opening of the down-passage and operatively connected with said casing dampers.

2. A radiator casing comprising a radiator-receiving portion provided with dampers and a portion adapted to be separated therefrom by an end section of the radiator, means preventing conduction of heat from the walls of one casing portion to the other, said second portion having a floor of insulating material and a top wall, a vertical partition of insulating material dividing the space therein into a down-passage and an up-passage open to each other through said partition near said floor, one of said passages being in heat-interchanging relation with the end of the radiator and opening through said top wall, and the other passage being insulated from the radiator and opening through the end wall of the casing below said top wall to receive air from the room, and a thermostat located near the opening of the down-passage and operatively connected with said casing dampers.

3. A radiator casing comprising a radiator-receiving portion provided with dampers and a second portion adapted to be separated therefrom by the end section of the radiator, a hood surmounting both portions, heat insulating means preventing conduction of heat from the walls of one casing portion to the other, said second portion having a floor and a top wall both of insulating material, a vertical partition of insulating material dividing the space therein into a down-passage and an up-passage open to each other through said partition near the said floor, the up-passage being in heat-interchanging relation with said end section of the radiator and open to the hood through said top wall, and the down-passage being insulated from said radiator section and open below said top wall to receive air from the room, and a thermostat located in said down-passage near said opening and having connections with the casing dampers.

4. A radiator casing provided with dampers, a radiator therein having an end wall adapted to divide the casing into a radiator-receiving section and an extension thereof and provided with an inlet connection underneath the radiator, heat insulating means preventing conduction of heat from the walls of one casing section to the other, said extension section having a heat insulating floor located above and beyond said connection and a top wall, a vertical partition of heat insulating material dividing the extension space into a down-passage and an up-passage open to each other through said partition near the said floor, one of said passages opening through said top wall and in heat-interchanging relation with said radiator wall and the other insulated from the latter and open below said top wall to receive air from the room, and a thermostat located in said down-passage near said opening and having connections with the casing dampers.

5. A radiator casing provided with a hood and divided into a radiator-receiving chamber having openings into the hood, dampers controlling said openings, and an air circulating conduit open to said hood and having one portion in heat-interchanging relation with the first-named chamber and another portion out of heat-interchanging relation with said first-named chamber for receiving air from the room, and a thermostatic device in the inlet end of the last-named portion of said conduit for controlling said dampers by variation of temperature of air entering from the room.

6. In a device of the character described, the combination of a radiator, a casing for said radiator, dampers controlling the circulation of air through said casing, an air-passage having upper and lower openings and in heat-interchanging relation with said radiator, a conduit connected with the said lower opening, said conduit opening near its top exterior to said casing, means insulating said conduit from the heating influence of said radiator and said passage, and thermosensitive means located in said conduit and operatively connected to said dampers.

7. In a device of the character described, the combination of a radiator, a casing for said radiator, dampers controlling the circulation of air through said casing, an air passage closed against air circulation between said casing and passage, said passage having upper and lower openings and being in heat-interchanging relation with said radiator, a conduit connected with the said lower opening, said conduit opening near its top exterior to said casing, means insulating said conduit from the heating influence of said radiator and said passage, and thermosensitive means located in said conduit and operatively connected to said dampers.

8. In a device of the character described, the combination of a radiator, a casing for said radiator, dampers controlling the circulation of air through said casing, an air-passage having upper and lower openings and in heat-interchanging relation with said radiator, a conduit connected with the said lower opening, said conduit opening near its top exterior to said casing, means insulating said conduit from the heating influence of said radiator and said passage and comprising a heat-insulating partition intermediate said passage and conduit, and thermosensitive means located in said conduit and operatively connected to said dampers.

9. In a device of the character described, the combination of a radiator, a casing for said radiator, dampers controlling the circulation of air through said casing, an air passage having upper and lower openings and in heat-interchanging relation with said radiator, a conduit connected with the said lower opening, said conduit opening near its top exterior to said casing, means insulating said conduit from the heating influence of said radiator and said passage and comprising means preventing the conduction of heat between the walls of said casing and said conduit, and thermosensitive means located in said conduit and operatively connected to said dampers.

10. In a device of the character described, the combination of a radiator, a casing for said radiator, dampers controlling the circulation of air through said casing, an air passage having upper and lower openings and in heat-interchanging relation with said radiator, a conduit connected with the said lower opening, said conduit opening near its top exterior to said casing, means insulating said conduit from the heating influence of said radiator and said passage and comprising a heat-insulating partition intermediate said passage and conduit and means preventing the conduction of heat between the walls of said casing and said conduit, and thermosensitive means located in said conduit and operatively connected to said dampers.

11. In a device of the character described, the combination of a radiator, a casing for said radiator, dampers controlling the circulation of air through said casing, an air passage having upper and lower openings and so positioned that the heating effect of said radiator induces an air circulation therethrough, a conduit connected with said lower opening, means insulating said conduit from the heating influence of said radiator and said passage, and thermosensitive means located in said conduit and operatively connected to said dampers.

12. In combination with a source of heat and means for controlling the same, thermosensitive means operatively connected with said controlling means, a conduit within which a temperature-responsive element of said thermosensitive means is disposed and within which it is concealed, said conduit having an inlet positioned to receive air at a level intermediate the upper and lower strata of air within the room with which it communicates, and means for inducing a circulation of air through said conduit and over said temperature-responsive element, said conduit being insulated from all other heating influences than the air circulating therethrough.

13. In combination with a source of heat and means for controlling the same, thermosensitive means operatively connected with said controlling means, a conduit within which a temperature-responsive element of said thermosensitive means is disposed and within which it is concealed, said conduit having an inlet positioned to receive air at a level intermediate the upper and lower strata of air within the room with which it communicates, and means for inducing a circulation of air through said conduit and over said temperature-responsive element, said temperature-responsive element being insulated from all other heating influences than the air circulating thereover.

14. A radiator casing comprising a radiator-receiving portion provided with dampers and a portion adapted to be separated therefrom by an end section of the radiator, means preventing conduction of heat from the walls of one casing portion to the other, an air passage in said second portion in heat-interchanging relation with the radiator, said passage having an outlet opening adjacent its upper end, a conduit communicating with the lower end of said passage, and a thermostat in said conduit operatively connected with said casing dampers.

15. A radiator casing comprising a radiator-receiving portion provided with dampers and a portion adapted to be separated therefrom by an end section of the radiator, an air passage in said second portion in heat-interchanging relation with the radiator, said passage having an outlet opening adjacent its upper end, a conduit in said second portion separated from said passage by a partition of heat-insulating material, said conduit communicating with the lower end of said passage, and a thermostat in said conduit operatively connected with said casing dampers.

16. A radiator casing comprising a radiator-receiving portion provided with dampers and a portion adapted to be separated therefrom by an end section of the radiator, an air passage in said second portion in heat-interchanging relation with the radiator, said passage having an outlet opening adjacent its upper end, a conduit communicating with the lower end of said passage, and a thermostat in said conduit operatively connected with said casing dampers and insulated from the heating influence of said passage and radiator.

17. A radiator casing comprising a radiator-receiving portion provided with dampers and a portion adapted to be separated therefrom by an end section of the radiator, means preventing conduction of heat from the walls of one casing portion to the other, an air passage in said second portion in heat-interchanging relation with the radiator, said passage having an outlet opening adjacent its upper end, a conduit in said second portion separated from said passage by a partition of heat-insulating material, said conduit communicating with the lower end of said passage, and a thermostat in said conduit operatively connected with said casing dampers.

18. In a device of the character described, the combination of a radiator, a casing for said radiator, dampers controlling the circulation of air through said casing, an extension of said casing provided with a vertical partition of insulating material dividing said extension into a passage in heat-interchanging relation with said radiator and a conduit communicating with said passage adjacent its lower end, said passage having an outlet opening adjacent its upper end and said conduit having an inlet opening adjacent its upper end, and thermosensitive means located in said conduit and operatively connected to said dampers.

19. In a device of the character described, the combination of a radiator, a casing for said radiator, dampers controlling the circulation of air through said casing, an extension of said casing provided with a vertical partition of insulating material dividing said extension into a passage in heat-interchanging relation with said radiator and a conduit communicating with said passage adjacent its lower end, said passage having an outlet opening adjacent its upper end and said conduit having an inlet opening adjacent its upper end, means preventing the conduction of heat between the walls of said casing and said extension, and thermosensitive means located in said conduit and operatively connected to said dampers.

20. In a device of the character described, the combination of a radiator, a casing for said radiator, dampers controlling the circulation of air through said casing, an extension of said casing provided with a vertical partition of insulating material dividing said extension into a passage in heat-interchanging relation with said radiator and a conduit communicating with said passage adjacent its lower end, said passage having an outlet opening adjacent its upper end and said conduit having an inlet opening adjacent its upper end, means preventing the conduction of heat between the walls of said casing and said extension, a floor of insulating material in said extension, and thermosensitive means located in said conduit and operatively connected to said dampers.

21. In a device of the character described, the combination of a radiator, a casing for said radiator, dampers controlling the circulation of air through said casing, an extension of said casing provided with a vertical partition dividing said extension into a passage in heat-interchanging relation with said radiator and a conduit communicating with said passage adjacent its lower end, said passage having an outlet opening adjacent its upper end and said conduit having an inlet opening adjacent its upper end, means preventing the conduction of heat between the walls of said casing and said extension, and thermosensitive means located in said conduit and operatively connected to said dampers.

22. In a device of the character described, the combination of a radiator, a casing for said radiator, dampers controlling the circulation of air through said casing, an extension of said casing provided with a vertical partition dividing said extension into a passage in heat-interchanging relation with said radiator and a conduit communicating with said passage adjacent its lower end, said passage having an outlet opening adjacent its upper end and said conduit having an inlet opening adjacent its upper end, thermosensitive means located in said conduit and operatively connected to said dampers, and means insulating said thermosensitive means from the heating influence of said radiator and said passage.

23. In a device of the character described, the combination of a radiator, a casing for said radiator, dampers controlling the circulation of air through said casing, an upwardly directed air passage having an outlet adjacent its upper end and in heat-interchanging relation with said radiator, a downwardly directed conduit with which said passage is in communication, said conduit having an inlet adjacent its upper end, means insulating said conduit from the heating influence of said radiator and said passage, and thermosensitive means located in said conduit and operatively connected to said dampers.

24. In a device of the character described, the combination of a radiator, a casing for said radiator, dampers controlling the circulation of air through said casing, an upwardly directed air passage having an outlet adjacent its upper end and in heat-interchanging relation with said radiator, a downwardly directed conduit with which said passage is in communication, said conduit having an inlet adjacent its upper end and being in non-heat-interchanging relation with said radiator and said passage, and thermosensitive means located in said conduit and operatively connected to said dampers.

25. In a device of the character described, the combination of a radiator, a casing for said radiator, dampers controlling the circulation of air through said casing, an air passage having upper and lower openings and so positioned that the heating effect of said radiator induces an air circulation therethrough, a conduit connected with said lower opening, said conduit opening near its top exterior to said casing, means insulating said conduit from the heating influence of said radiator and said passage, and thermosensitive means located in said conduit and operatively connected to said dampers.

In testimony whereof I have signed this specification.

WESTON M. FULTON.